US012608657B1

(12) United States Patent
Gao et al.

(10) Patent No.: US 12,608,657 B1
(45) Date of Patent: Apr. 21, 2026

(54) AUTOMATED CONTINUAL LEARNING SYSTEM FOR MACHINE LEARNING MODELS

(71) Applicant: INTUIT INC., Mountain View, CA (US)

(72) Inventors: Xiang Gao, Clyde Hill, WA (US); Yuguang Yao, San Jose, CA (US); Kamalika Das, Saratoga, CA (US); Avinash Baidya, Mountain View, CA (US); Ruocheng Guo, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/372,380

(22) Filed: Oct. 29, 2025

(51) Int. Cl.
G06N 20/00 (2019.01)

(52) U.S. Cl.
CPC .................................... G06N 20/00 (2019.01)

(58) Field of Classification Search
CPC ..................................................... G06N 20/00
See application file for complete search history.

(56) References Cited

U.S. PATENT DOCUMENTS

2023/0297577 A1 * 9/2023 Vo .......................... G06F 40/279
                                                          707/769
2024/0071378 A1 * 2/2024 Jonker .................... G06V 20/20

2024/0211370 A1 * 6/2024 Mattivi ............... G06F 11/3409
2024/0311619 A1 * 9/2024 Licato .................... G06N 20/00

OTHER PUBLICATIONS

Gao, "Customizing Language Model Responses with Contrastive In-Context Learning", The Thirty-Eighth AAAI Conference on Artificial Intelligence, Published Mar. 24, 2024. (Year: 2024).*
Wendi Cui et al., "SEE: Strategic Exploration and Exploitation of Cohesive In-Context Prompt Optimization", arXiv:2402.11347v2 [cs. CL] Jul. 12, 2025.

* cited by examiner

*Primary Examiner* — Dave Misir

(74) *Attorney, Agent, or Firm* — Patterson + Sheridan, LLP

(57) ABSTRACT

Techniques described herein involve providing an automated continual learning system for machine learning models. Embodiments include generating, using a machine learning model, an output based on a sample input provided to the machine learning model. Embodiments include evaluating the output based on comparing the output to an associated training output. Embodiments include creating a natural language rule based on the evaluating using a language processing machine learning model and storing the natural language rule in a rule library. Embodiments include receiving an input to the machine learning model and retrieving, in response to the input, one or more relevant rules from the rule library. Embodiments include generating, using the machine learning model, a response based on the input and the one or more relevant rules and performing an action based on the response.

11 Claims, 5 Drawing Sheets

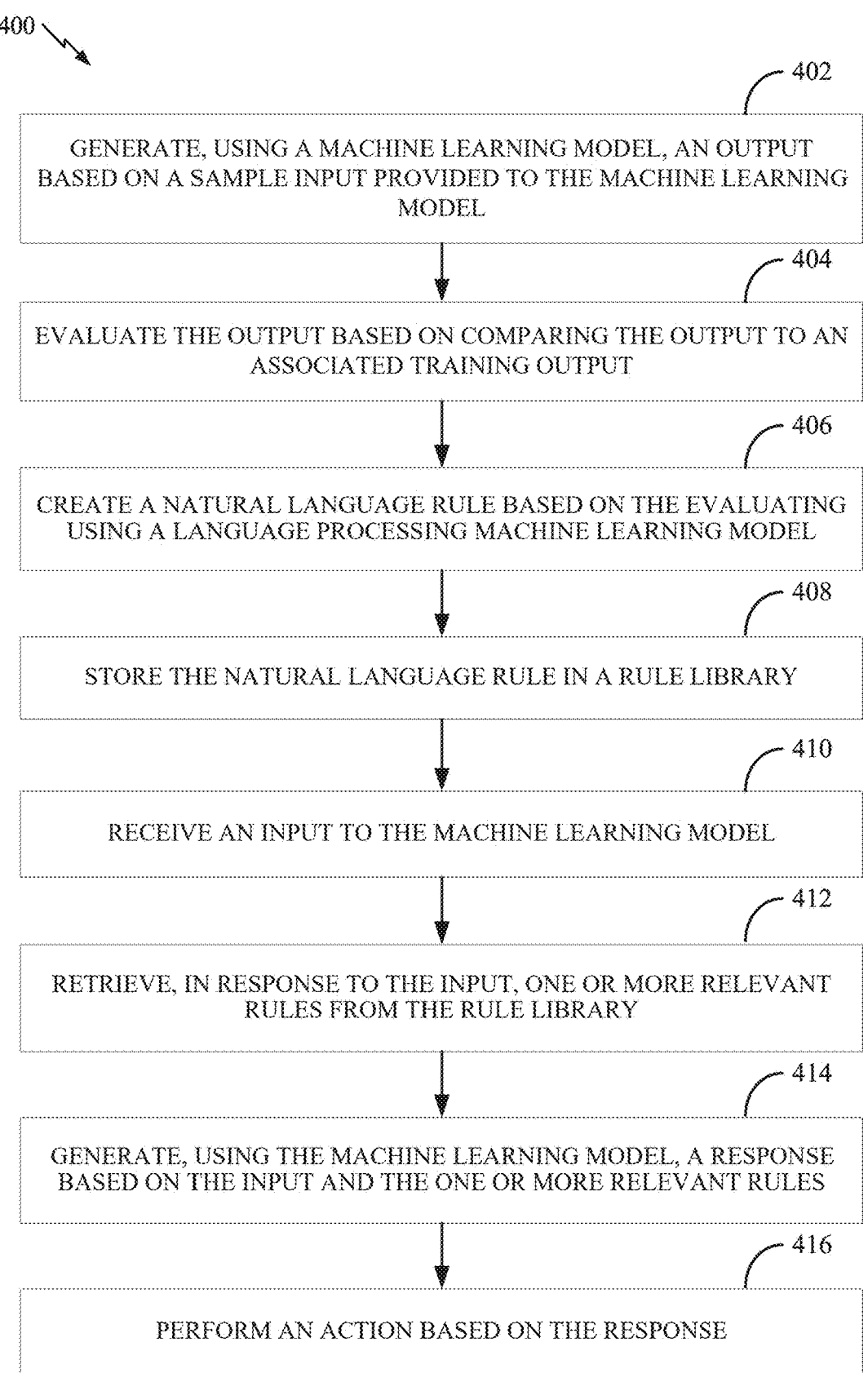

400

402
GENERATE, USING A MACHINE LEARNING MODEL, AN OUTPUT BASED ON A SAMPLE INPUT PROVIDED TO THE MACHINE LEARNING MODEL

404
EVALUATE THE OUTPUT BASED ON COMPARING THE OUTPUT TO AN ASSOCIATED TRAINING OUTPUT

406
CREATE A NATURAL LANGUAGE RULE BASED ON THE EVALUATING USING A LANGUAGE PROCESSING MACHINE LEARNING MODEL

408
STORE THE NATURAL LANGUAGE RULE IN A RULE LIBRARY

410
RECEIVE AN INPUT TO THE MACHINE LEARNING MODEL

412
RETRIEVE, IN RESPONSE TO THE INPUT, ONE OR MORE RELEVANT RULES FROM THE RULE LIBRARY

414
GENERATE, USING THE MACHINE LEARNING MODEL, A RESPONSE BASED ON THE INPUT AND THE ONE OR MORE RELEVANT RULES

416
PERFORM AN ACTION BASED ON THE RESPONSE

FIG. 4

TO NETWORK
510

AUTOMATED CONTINUAL LEARNING SYSTEM FOR MACHINE LEARNING MODELS

Aspects of the present disclosure relate to techniques for providing an automated continual learning system for machine learning models. In particular, techniques described herein involve comparing an output generated by a machine learning model to a training output, generating a natural language rule based on differences between the output and the training output, and storing the natural language rule in a rule library. Techniques described herein further involve retrieving, in response to an input, one or more relevant rules from the rule library and generating a response using the machine learning model based on the input and the one or more relevant rules.

BACKGROUND

Every year, millions of people, businesses, and organizations around the world use software applications to assist with countless aspects of life. The use of machine learning models, including language processing machine learning models, in software applications has become widespread. Because of this, both the amount of input queries and the complexity of input queries provided to, for example, language processing machine learning models have greatly increased. Machine learning models that are not trained (e.g., fine-tuned) for the particular task for which they are used may generate inaccurate and/or inconsistent outputs due to a limited knowledge base. Inaccurate and/or inconsistent outputs may result in providing a user with erroneous results in response to a given input, which may also require the user to run the model again to re-process the input. Such inefficiency may result in significant computational costs and energy consumption associated with language processing machine learning models.

Alternatively, training machine learning models for specific use cases is often costly, with respect to both time and computing resources (e.g., as training may be based on a vast amount of unstructured data that takes time and resources to process). Such costs are compounded when a separate machine learning model must be trained for each of a variety of topic areas. Additionally, without constant updates, the data becomes nearly immediately outdated. Both of these realities may further result in inaccurate and/or inconsistent outputs generated by the machine learning model as the machine learning model lacks the most relevant and most up-to-date information that would otherwise enable generation of optimized outputs.

Thus, there is a need in the art for improved techniques for optimizing machine learning model training and output generation.

BRIEF SUMMARY

Certain embodiments provide a method for providing an automated continual learning system for machine learning models. The method generally includes: generating, using a machine learning model, an output based on a sample input provided to the machine learning model; evaluating the output based on comparing the output to an associated training output; creating a natural language rule based on the evaluating using a language processing machine learning model; storing the natural language rule in a rule library; receiving an input to the machine learning model; retrieving, in response to the input, one or more relevant rules from the rule library; generating, using the machine learning model, a response based on the input and the one or more relevant rules; and performing an action based on the response.

Other embodiments provide processing systems configured to perform the aforementioned method as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 4 depicts example operations related to providing an automated continual learning system for machine learning models.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
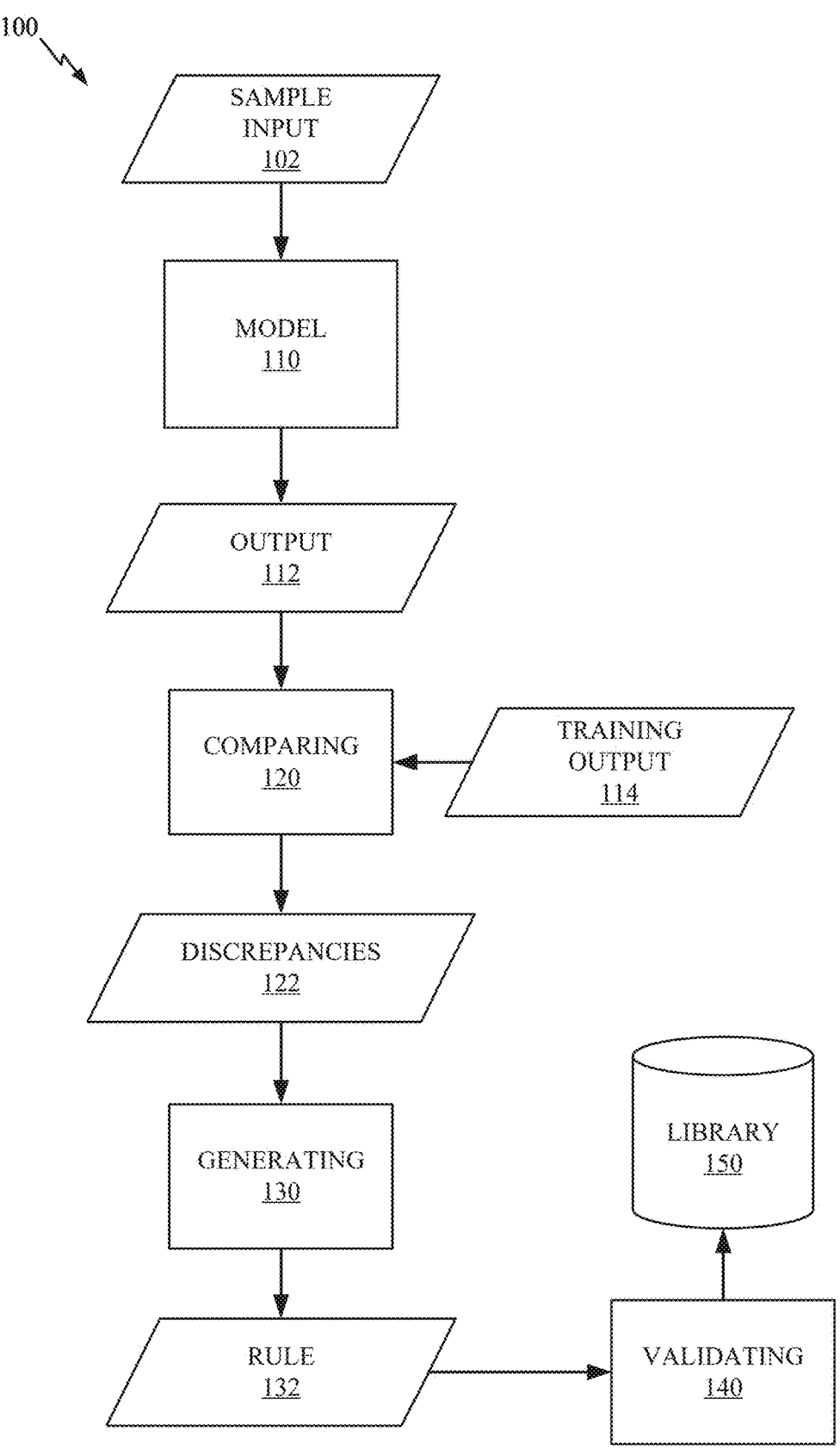
FIG. 1 depicts an example workflow related to providing an automated continual learning system for machine learning models.

Aspects of the present disclosure provide apparatuses, methods, processing systems, and computer-readable mediums for providing an automated continual learning system for machine learning models.

Machine learning models are increasingly used for a variety of tasks (such as query evaluation, output generation, etc.). Many machine learning models are trained only on general knowledge bases, which may cause incomplete and/or inaccurate results when tasked with specific queries. In order to refine results for specific topics, current techniques involve fine-tuning a large number of machine learning models (e.g., one for each topic). Training just one machine learning model requires a significant amount of time and resources, which is compounded with each additional model, resulting in vast training costs. To improve response generation and model training, techniques described herein employ a series of steps to automatically generate natural language rules (e.g., for providing to a model that has been trained in a general manner but that has not been fine-tuned) by comparing outputs from a machine learning model to training outputs and evaluating differences between them, storing the natural language rules in a rule library, and, prior to generating a response to an input provided to the machine learning model, retrieving relevant rules from the rule library to use in generating the response. Such techniques provide a more efficient process for response generation that uses significantly less resources while maintaining accuracy.

First, an output may be generated using a machine learning model based on a sample input provided to the machine learning model. The output may then be compared to a training output associated with the sample input (e.g., the training output is the optimal, ideal, or otherwise verified output desired from a model). During the comparing, discrepancies between the output and the training output may be identified. For example, the output generated by the machine learning model may contain errors, may be missing relevant content, or may otherwise be inaccurate or incomplete with respect to the training output. A natural language explanation for the discrepancies (e.g., why the machine learning model generated an output not matching the training output) may be created using a language processing machine learning model (which may be a separate model than the model that generated the output or the same model). The natural language explanation may then be formulated into a concise rule (e.g., for providing to the machine learning model during a future output generation process). A rule may contain instructions for the machine learning model to follow during output generation, context data (e.g., additional information such as from a knowledge base), directions on how to use a tool (e.g., a search engine, calculator, etc.), and/or the like. One or more rules may be created via this process and the rules may be stored in a rule library for future use.

In some cases, prior to storing the rules, each rule may be validated to ensure accuracy, effectiveness, efficiency, and/ or the like. For example, validation checks performed on the rules may include determining whether a rule reduces the discrepancies between the output and the associated training output (i.e., improves the output accuracy), comparing the rule to existing rules in the rule library based on a threshold similarity level (e.g., to avoid repetitive rules), and/or evaluating the rule based on efficiency parameters (e.g., to minimize the resources expended by the model when processing the rule).

Once the rule library is populated, the rules may be used for output generation. For example, in response to an input being provided to the machine learning model, one or more relevant rules may be retrieved from the rule library. The relevant rules may be retrieved based on determining semantic similarity between the input and a subset of the available rules stored in the rule library. The machine learning model may then use the relevant rules, along with the input, to generate a response. An action may then be performed based on the response, such as displaying the response via a user interface and/or sending the response to one or more elements of a software application. In some cases, the response may be analyzed (e.g., for accuracy, completeness, etc.) and a new rule may be created and stored in the rule library as described above.

Embodiments of the present disclosure provide numerous technical and practical effects and benefits. Current techniques for machine learning model training and response generation rely on training large numbers of machine learning models on specific topic areas, which causes high costs and uses significant computing resources. Alternatively, using generic models that are not fine-tuned results in inefficient and/or inaccurate results, which causes a diminished user experience, diminished application performance, as well as increased costs associated with re-processing incorrect outputs. The present disclosure solves this technical problem. Techniques described herein ensure more efficient, less costly processing while maintaining model and output accuracy. By automatically creating natural language rules based on evaluating model performance against ideal outputs, any machine learning model (e.g., a generic model) may then use the rules to generate outputs with comparable accuracy but without having to first fine-tune the model, substantially reducing the amount of energy and computing resources that would otherwise be expended to generate an output with that accuracy. For example, outputs generated from a machine learning model are compared to training outputs to identify discrepancies between them. Explanations may then be generated describing why the discrepancies were caused, which are used to create natural language rules for providing to the model during output generation. The natural language rules may provide directions, or other types of context, to the model (e.g., in lieu of fine-tuning), allowing the model to generate outputs with at least the same level of accuracy, but while saving energy and computing resources. By retrieving only the most relevant rules (e.g., from a rule library where the rules are stored), based on semantic similarity to the input to be processed by the model, the model need only process those rules that will help generate an improved response, ensuring accuracy is maintained while simultaneously reducing the resources expended (e.g., compared to processing all rules, including those irrelevant to the input). Additionally, performing validation checks on each rule, prior to storing or using the rule, ensures that the rules are concise (e.g., may be processed efficiently), unique (i.e., not repetitive), and practical (e.g., accurate and useful to generating improved responses), further saving time and resources during inference time.

Example Workflows Related to Providing an Automated Continual Learning System for Machine Learning Models FIG. 1 depicts an example workflow 100 related to providing an automated continual learning system for machine learning models. For example, workflow 100 may represent a series of steps associated with generating and validating rules based on identified discrepancies between an output from a machine learning model and an associated training output.

A model 110 may generate an output 112 in response to a sample input 102. The sample input 102 may comprise a natural language query seeking to elicit a response (e.g., output 112) from the model 110. The model 110 may comprise a machine learning model. In one example, model 110 is a language processing machine learning model such as a large language model (LLM) or a small language model. For example, model 110 may have been trained on a large training data set in order to process natural language inputs and generate natural language content in response. In some embodiments, model 110 is a generative pre-trained transformer (GPT) model that has been trained on a large set of training data (e.g., across a plurality of domains), and is capable as a result of such training to perform a wide variety of language-related tasks in response to natural language prompts. In some embodiments, model 110 has been fine-tuned for one or more particular domains, such as for use with a particular software application or for a specific purpose, while in other embodiments model 110 has been trained in a more general fashion and has not been fine-tuned in such a manner. Model 110 may have a large number of tunable parameters, which are iteratively adjusted during a model training process based on training data. In alternative embodiments, model 110 may be another type of machine learning model that is capable of generating content. For example, model 110 may be a generative adversarial network (GAN), an autoencoder model, an autoregressive model, a diffusion model, a Bayesian network, a hidden Markov model, and/or the like. In general, machine learning models such as LLMs are trained (and/or fine-tuned) by exposing the model to large datasets and iteratively adjusting internal parameters, such as to minimize an objective function. The objective function quantifies the difference between the model's predictions and the desired outputs (e.g., which may be indicated by labels in the training data or otherwise may be the target output of the model), guiding the optimization process to improve model performance over time.

The output 112 may then be compared to a training output 114 during comparing 120. The training output 114 may be associated with the sample input 102. For example, the training output 114 may comprise the optimal or ideal output that is desired from the model 110 in response to the sample input 102. During comparing 120, discrepancies 122 between the output 112 and the training output 114 may be identified. For example, the output 112 may contain errors, may be missing relevant content, or is otherwise inaccurate or incomplete with respect to the training output 114. Based on the discrepancies 122, a rule 132 (or, in some embodiments, more than one rule) may be generated during generating 130. The generating 130 may comprise creating a natural language explanation for the discrepancies 122, such as by using a language processing machine learning model. The language processing machine learning model may correspond to the model 110 or may comprise a separate machine learning model. The natural language explanation may indicate why the model 110 generated an output not matching the training output 114. The natural language explanation may then be reformulated into a natural language rule. For example, reformulating the explanation into a rule may comprise altering the explanation to improve conciseness (e.g., for increasing model efficiency when processing the rule), transforming the explanation into imperative form (e.g., making it a command for the model 110 to follow), and/or the like. In some aspects, the reformulating of the explanation into the rule may be performed using a language processing machine learning model (e.g., the same model or a different model than the one used to generate the explanation), such as by prompting the model to reformulate the explanation into a rule, such as specifying a format or structure for the rule in the prompt. In other aspects, the reformulating of the explanation into the rule may be performed manually and/or using other types of rules and/or logic. The rule 132 may contain, among others, instructions for the model 110 to follow (e.g., during output generation), context data (e.g., additional information such as from a knowledge base for use when generating future outputs), directions on how to use a tool, and/or the like. Tools may include other machine learning models, search engines, code bases, knowledge retrieval system, and/or the like (these are provided only as examples and other tools may be used by the model 110 and included in the rules).

The rule 132 may then undergo validating 140 prior to being stored in a library 150. During validating 140, the rule 132 may be validated to ensure accuracy, effectiveness, efficiency, and/or the like by performing one or more validation checks on the rule 132. For example, a validator (e.g., validator 360 of FIG. 3) may determine whether the rule 132 reduces the discrepancies 122 between the output 112 and the training output 114 and, if it does, the rule 132 may be retained since it will improve future output accuracy. Additionally, the rule 132 may be compared to existing rules in the library 150 based on a threshold similarity level. If, for instance, the rule 132 is too similar to another rule, it may be removed, thereby avoiding repetitive rules that increase processing costs without increasing accuracy. The rule 132 may also be evaluated based on efficiency parameters (e.g., the rule 132 may be reduced in size in order to minimize the resources expended by the model when processing the rule, but while keeping the most relevant parts to maintain accuracy). The process of FIG. 1 may repeat to generate and store a plurality of rules in the library 150 for use in future output generation across a wide variety of tools, topic areas, etc.

Figure 2:
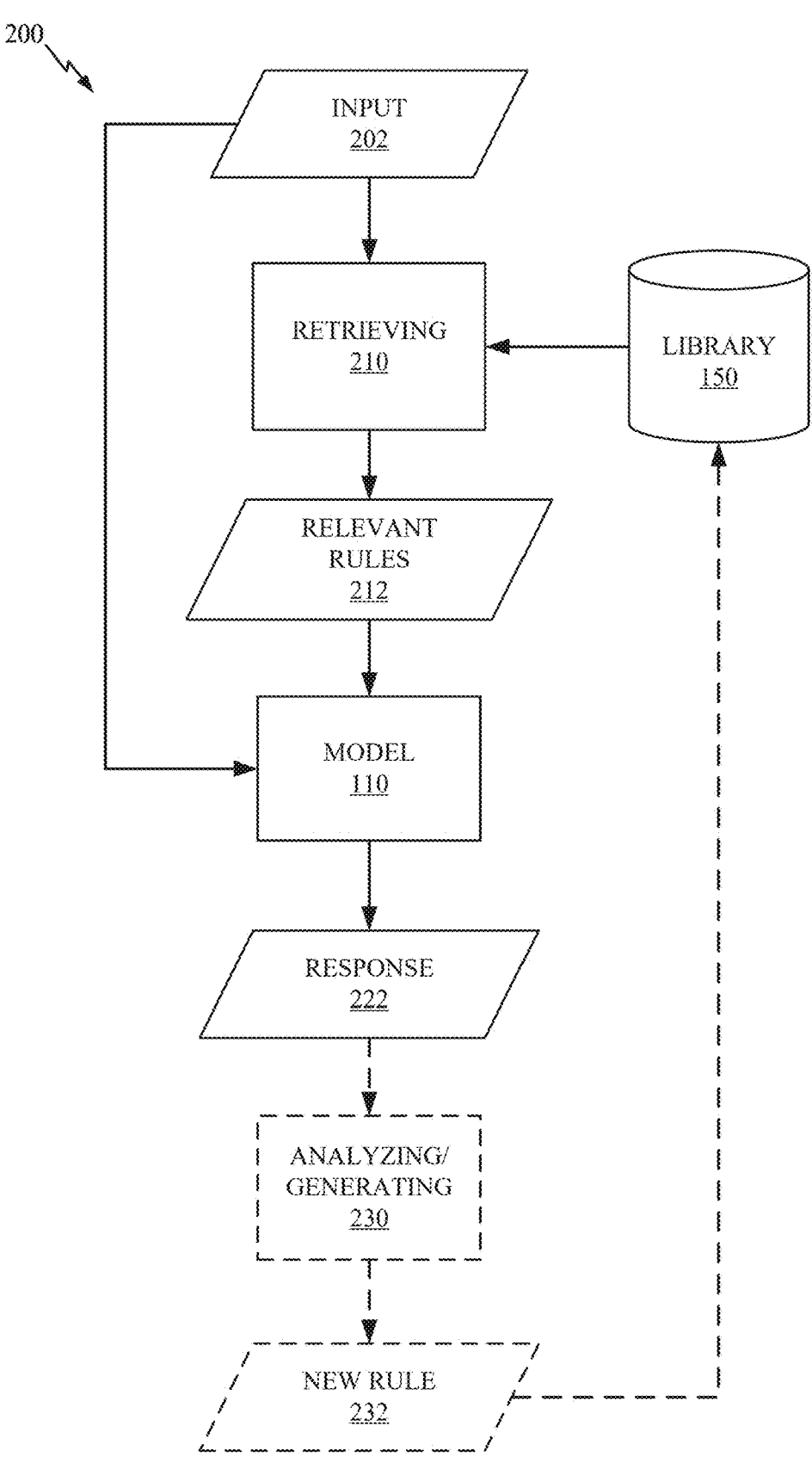
FIG. 2 depicts an additional example workflow related to providing an automated continual learning system for machine learning models.

FIG. 2 depicts an additional example workflow 200 related to providing an automated continual learning system for machine learning models. In particular, FIG. 2 depicts a series of steps by which relevant rules are retrieved and used by the machine learning model to generate a response.

Once the library 150 is populated, the rules stored therein may be used for future output generation. First, in response to receiving an input 202, one or more relevant rules 212 may be retrieved from the library 150 during retrieving 210. For example, an LLM may be implemented (e.g., retriever 320 of FIG. 3) to analyze the input 202 and choose the one or more rules that are most relevant to the particular tool to be used, the topic area associated with the input 202, etc. In some embodiments, the relevant rules 212 may be retrieved based on determining semantic similarity between the input 202 and a subset of the available rules stored in the library 150. In general, semantic similarity is a measure of how closely related two pieces of text are related in meaning (e.g., rather than considering just their exact wording). For example, the text may be converted into numerical representations, such as embeddings, which are then compared using mathematical techniques like cosine similarity.

The model 110 may then use the relevant rules 212, along with the input 202, to generate a response 222. As a result, the response 222 is generated with the same accuracy as a model that has been fine-tuned, but without having to expend the significant resources to fine-tune that model. An action may then be performed based on the response 222, such as displaying the response 222 via a user interface and/or sending the response 222 to one or more elements of a software application.

In some embodiments, the response 222 may be analyzed (e.g., for accuracy, completeness, etc.) and a new rule 232 may be generated during analyzing/generating 230. For example, the new rule 232 may be generated based on identifying errors in the response 222 and creating an explanation for reducing those errors in the future, as described above with respect to FIG. 1. The new rule 232 may then be stored in the library 150 for future use. This loop allows for continual learning and adaptation over time, ensuring the model 110 remains updated and accurate without costly training.

Figure 3:
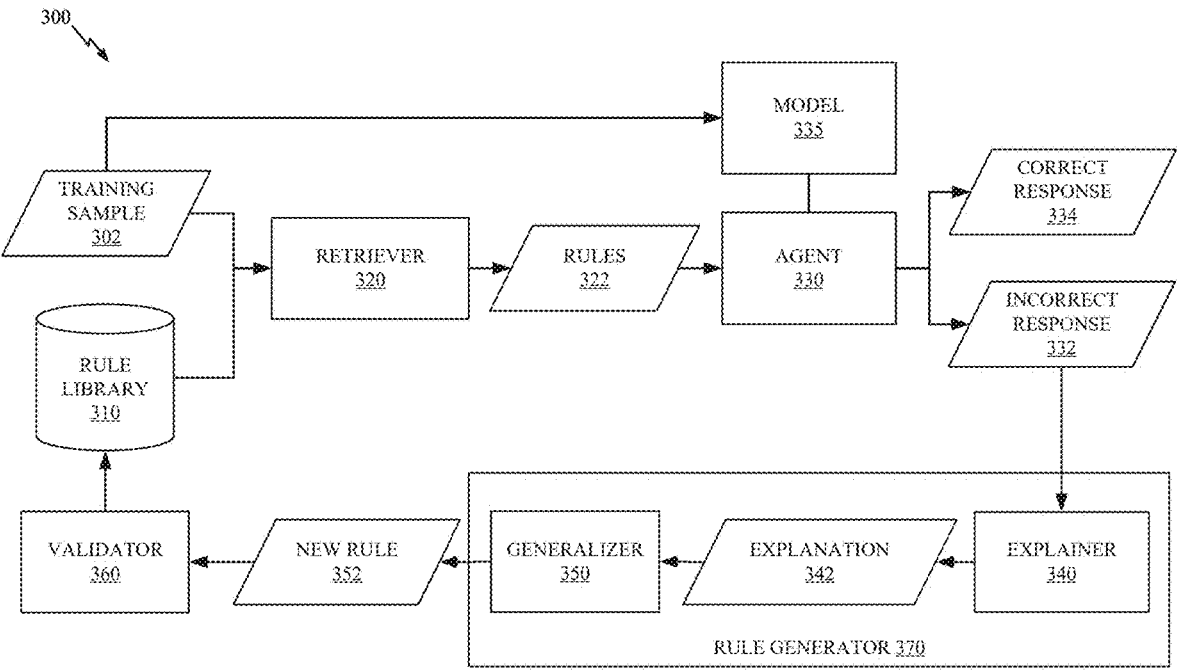
FIG. 3 depicts an additional example workflow related to providing an automated continual learning system for machine learning models.

FIG. 3 depicts an additional example workflow 300 related to providing an automated continual learning system for machine learning models. In particular, FIG. 3 depicts a dynamic feedback loop associated with generating, retrieving, and implementing the rules from FIG. 1 and/or FIG. 2.

As discussed above with respect to FIG. 1 and FIG. 2, the present system utilizes an automated continual learning loop that ensures output accuracy while saving resources. For example, when the system receives an input, such as training sample 302, the input may be passed to retriever 320. The retriever 320 may comprise a machine learning model. In some embodiments, the retriever 320 may comprise a language processing machine learning model such as an LLM. The retriever 320 may be provided a prompt (e.g., containing instructions, parameters, etc.) directing it to select one or more relevant rules from a plurality of rules that are contained in the rule library 310 (e.g., library 150 populated according to one or more steps discussed above). The retriever 320 may identify relevant rules, for instance, based on their semantic similarity to the training sample 302. A sample prompt for providing to the retriever 320 is provided below:

Given the question: {question}
and the available tools: {tools description}
Select a subset of rules that:
1) are most relevant and useful for addressing the question,
2) exhibit minimal overlap with one another,
3) include at most {N} rules.
Below is the pool of candidate rules to choose from:
{list of rule id: rule content}
Please begin with an analysis to determine which rules are most appropriate,
and conclude your response with a JSON object of the form
{"selected_rule_ids": [list of int]}.

The rules 322 retrieved by the retriever 320 may then be passed to model 335, or an associated agent 330. The agent 330 may be configured to generate a response based on an input using reasoning and/or invoking one or more tools (e.g., search engine, calculator, etc.). The agent 330 may also use the rules 322 to help generate the response (e.g., as reasoning guides that influence the trajectory of its decision-making process). Since the retriever 320 selects only the most relevant rules from the rule library 310, the rules 322 are directly applicable to the input and/or tools, helping improve the accuracy of the response (e.g., compared to not using any rules) while maintaining efficiency (since not all rules are processed each time a response is generated).

The response generated by the agent 330 may be analyzed for accuracy, such as by comparing the response to an ideal output (e.g., training output 114 of FIG. 1), previous responses, and/or the like. If the response does not contain any errors, or contains a number of errors less than a threshold value, it may be classified as a correct response 334. If the response is classified as correct, then the process is concluded and the correct response 334 may be provided to a user (e.g., via a user interface), sent to one or more elements of a software application, and/or the like. If, on the other hand, the response contains errors (e.g., exceeding the threshold value), is incomplete, or otherwise inaccurate, it may be classified as an incorrect response 332. The incorrect response 332 is then provided to rule generator 370, which creates a new rule 352 based on the incorrect response 332. For example, the rule generator 370 may comprise an explainer 340 and a generalizer 350. The explainer 340 may comprise an LLM configured to diagnose and articulate the specific reasoning flaw (e.g., as to why the response was incorrect). The explainer 340 may generate a natural language explanation 342 containing the reason(s) for the errors(s). A sample prompt for providing to the explainer 340 is provided below:

An agent failed to solve the problem correctly. Your task is to provide an explanation that can help avoid making the same mistake in the future.
Below are the previous instructions and context:
Question:
{Question}
Tools:
{Tools}
Rules to follow:
{Rules}
Previous agent response:
{Response}
Correct steps:
{Correct steps}
Please provide a clear explanation to the agent outlining why the mistake occurred and how to approach similar cases correctly going forward.

The generalizer 350 may then reformulate the explanation 342 into a more abstract, reusable rule (e.g., optimized for conciseness, applicability across domains, etc.), new rule 352. A sample prompt for providing to the generalizer 350 is provided below:

An agent failed to solve the problem correctly. Your task is to generate a generalizable rule that can help avoid similar mistakes in the future.
Below are the previous instructions and context:
Question:
{Question}
Tools:
{Tools}
Rules to follow:
{Rules}
Previous agent response:
{Response}
Correct steps:
{Correct steps}
Explanation of how to reach the correct answer:
{Explanation}
Please distill the explanation into a single general rule that would help the agent avoid this type of error.
The rule should be written in pseudocode form using an "if . . . then . . . " or "if . . . , do . . . , else do . . . " structure.
Each action (the "then"/"else" part) should be a simple, atomic operation rather than a compound procedure.
The rule should complement—rather than repeat—the previous instructions.
Conclude your response with: {"new_rule": str}

One or more components, such as the retriever 320, the model 335 and associated agent 330, the explainer 340, and/or the generalizer 350, may comprise separate machine learning models, such as LLMs, or may utilize the same LLM across multiple components (e.g., saving computing costs).

Once the new rule 352 is generated, it may be passed to a validator 360, which may comprise one or more components configured to perform one or more validation checks on each rule, as discussed above (e.g., determining whether a rule reduces the errors found in a particular response, comparing the rule to existing rules in the rule library to avoid repetitive rules, and/or evaluating the rule based on efficiency parameters to minimize the resources expended by the model when processing the rule), to ensure output accuracy and system efficiency. If the new rule 352 fails one or more validation checks, it may be disregarded. However, if the new rule 352 passes a requisite number of validation checks, the validated rule may then be stored in the rule library 310 for use in the next iteration for the system. This process may be repeated for any number of inputs received to the system, which is continuously updated and improved based on previous iterations. Each rule acts as a corrective framework that generalizes over a type of reasoning errors, expanding the model's coverage of a particular problem space. Additionally, the rules are stored in a continually evolving rule library, which guides future behavior, such as by injecting relevant rules into a prompt during inference time. As the model encounters new failures, new rules are generated and added, forming a lightweight continual learning loop that improves reasoning without retraining, manual supervision, or model updates.

Example Operations Related to Providing an Automated Continual Learning System for Machine Learning Models FIG. 4 depicts example operations 400 related to providing an automated continual learning system for machine learning models. For example, operations 400 may be performed by one or more of the components described with respect to FIG. 1, FIG. 2, and/or FIG. 3.

Operations 400 begin at step 402 with generating, using a machine learning model, an output based on a sample input provided to the machine learning model.

Operations 400 continue at step 404 with evaluating the output based on comparing the output to an associated training output. In some embodiments, the evaluating the output based on comparing the output to the associated training output comprises identifying discrepancies between the output and the associated training output and generating a natural language explanation for the discrepancies According to certain embodiments, the method further comprises reformulating the natural language explanation into the natural language rule, wherein the reformulating comprises altering content and linguistic characteristics of the natural language explanation using the language processing machine learning model.

Operations 400 continue at step 406 with creating a natural language rule based on the evaluating using a language processing machine learning model.

Operations 400 continue at step 408 with storing the natural language rule in a rule library. Some embodiments provide that the method further comprises, prior to the storing the natural language rule in the rule library, performing one or more validation checks on the natural language rule. In certain embodiments, the one or more validation checks comprise one or more of: determining whether the natural language rule reduces the discrepancies between the output and the associated training output; comparing the natural language rule to existing rules in the rule library based on a threshold similarity level; or evaluating the natural language rule based on efficiency parameters.

Operations 400 continue at step 410 with receiving an input to the machine learning model.

Operations 400 continue at step 412 with retrieving, in response to the input, one or more relevant rules from the rule library. According to some embodiments, the retrieving, in response to the input, the one or more relevant rules from the rule library is based on determining semantic similarity between the input and a subset of available rules stored in the rule library.

Operations 400 continue at step 414 with generating, using the machine learning model, a response based on the input and the one or more relevant rules.

Operations 400 continue at step 416 with performing an action based on the response. Certain embodiments provide that the performing the action based on the response comprises one or more of: analyzing the response, generating a new rule based on the analyzing, and storing the new rule in the rule library; displaying the response via a user interface; or sending the response to one or more elements of a software application.

Figure 5:
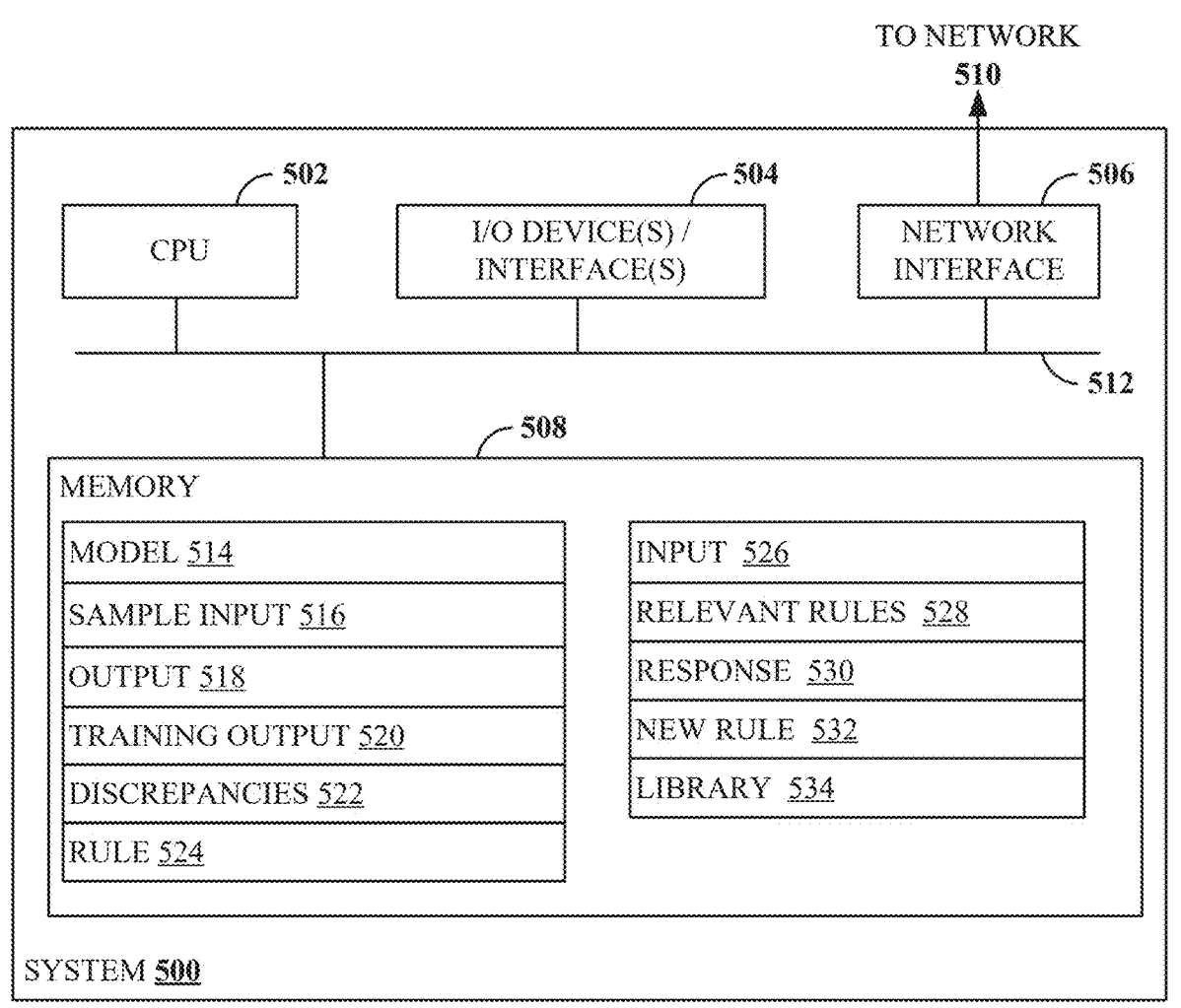
FIG. 5 depicts an example of a processing system for providing an automated continual learning system for machine learning models.

Example of a Processing System for Providing an Automated Continual Learning System for Machine Learning Models FIG. 5 illustrates an example system 500 with which embodiments of the present disclosure may be implemented. For example, system 500 may be configured to perform operations 400 of FIG. 4 and/or to implement one or more components as in FIG. 1, FIG. 2, or FIG. 3.

System 500 includes a central processing unit (CPU) 502, one or more I/O device interfaces that may allow for the connection of various I/O devices 504 (e.g., keyboards, displays, mouse devices, pen input, etc.) to the system 500, network interface 506, a memory 508, and an interconnect 512. It is contemplated that one or more components of system 500 may be located remotely and accessed via a network 510. It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508. CPU 502 is included to be representative of a single CPU, multiple CPUs, a single CPU having multiple processing cores, and other arrangements.

Additionally, the memory 508 is included to be representative of a random access memory or the like. In some embodiments, memory 508 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 508 includes model 514, sample input 516, output 518, training output 520, discrepancies 522, and rule 524. Model 514 may be representative of model 110 of FIG. 1 and FIG. 2. Sample input 516 may be representative of sample input 102 of FIG. 1. Output 518 may be representative of output 112 of FIG. 1. Training output 520 may be representative of training output 114 of FIG. 1 Discrepancies 522 may be representative of discrepancies 122 of FIG. 1. Rule 524 may be representative of rule 132 of FIG. 1.

Memory 508 further comprises input 526 which may correspond to input 202 of FIG. 2. Memory 508 further comprises relevant rules 528, which may correspond to relevant rules 212 of FIG. 2. Memory 508 further comprises response 530, which may correspond to response 222 of FIG. 2. Memory 508 further comprises new rule 532, which may correspond to new rule 232 of FIG. 2. Memory 508 further comprises library 534, which may correspond to library 150 of FIG. 1 and FIG. 2. It is noted that in some embodiments, system 500 may interact with one or more external components, such as via network 510, in order to retrieve data and/or perform operations. Furthermore, techniques described herein may be implemented via more or fewer components than those shown and described with respect to FIG. 5, such as on one or more computing systems.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a c c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for providing an automated continual learning system for machine learning models, comprising:
    generating, using a machine learning model, an output based on a sample input provided to the machine learning model;
    evaluating the output based on comparing the output to an associated training output, identifying discrepancies between the output and the associated training output, and generating a natural language explanation for the discrepancies;
    creating a natural language rule based on the evaluating using a language processing machine learning model, wherein the creating comprises reformulating the natural language explanation into the natural language rule, and wherein the reformulating comprises altering content and linguistic characteristics of the natural language explanation using the language processing machine learning model;
    storing the natural language rule in a rule library;
    receiving an input to the machine learning model;
    retrieving, in response to the input, one or more relevant rules from the rule library based on determining semantic similarity between the input and a subset of available rules stored in the rule library;
    generating, using the machine learning model, a response based on the input and the one or more relevant rules, wherein the one or more relevant rules, as a result of being retrieved based on the determining of the semantic similarity, enable the machine learning model to generate the response with at least a same level of accuracy without fine-tuning the machine learning model; and
    performing an action based on the response.

2. The method of claim 1, further comprising, prior to the storing the natural language rule in the rule library, performing one or more validation checks on the natural language rule.

3. The method of claim 2, wherein the one or more validation checks comprise one or more of:
    determining whether the natural language rule reduces the discrepancies between the output and the associated training output;
    comparing the natural language rule to existing rules in the rule library based on a threshold similarity level; or
    evaluating the natural language rule based on efficiency parameters.

4. The method of claim 1, wherein the performing the action based on the response comprises one or more of:
    analyzing the response, generating a new rule based on the analyzing, and storing the new rule in the rule library;
    displaying the response via a user interface; or
    sending the response to one or more elements of a software application.

5. A system for providing an automated continual learning system for machine learning models, comprising:
    one or more processors; and
    a memory comprising instructions that, when executed by the one or more processors, cause the system to:
        generate, using a machine learning model, an output based on a sample input provided to the machine learning model;
        evaluate the output based on comparing the output to an associated training output, identifying discrepancies between the output and the associated training output, and generating a natural language explanation for the discrepancies;
        create a natural language rule based on the evaluating using a language processing machine learning model, wherein the creating comprises reformulating the natural language explanation into the natural language rule, and wherein the reformulating comprises altering content and linguistic characteristics of the natural language explanation using the language processing machine learning model;

store the natural language rule in a rule library;

receive an input to the machine learning model;

retrieve, in response to the input, one or more relevant rules from the rule library based on determining semantic similarity between the input and a subset of available rules stored in the rule library;

generate, using the machine learning model, a response based on the input and the one or more relevant rules, wherein the one or more relevant rules, as a result of being retrieved based on the determining of the semantic similarity, enable the machine learning model to generate the response with at least a same level of accuracy without fine-tuning the machine learning model; and perform an action based on the response.

6. The system of claim 5, wherein the instructions, when executed by the one or more processors, further cause the system, prior to the storing the natural language rule in the rule library, to perform one or more validation checks on the natural language rule.

7. The system of claim 6, wherein the one or more validation checks comprise one or more of:

determining whether the natural language rule reduces the discrepancies between the output and the associated training output;

comparing the natural language rule to existing rules in the rule library based on a threshold similarity level; or evaluating the natural language rule based on efficiency parameters.

8. The system of claim 5, wherein the performing the action based on the response comprises one or more of:

analyzing the response, generating a new rule based on the analyzing, and storing the new rule in the rule library;

displaying the response via a user interface; or sending the response to one or more elements of a software application.

9. A non-transitory computer readable medium comprising instructions that, when executed by one or more processors of a computing system, cause the computing system to:

generate, using a machine learning model, an output based on a sample input provided to the machine learning model;

evaluate the output based on comparing the output to an associated training output, identifying discrepancies between the output and the associated training output, and generating a natural language explanation for the discrepancies;

create a natural language rule based on the evaluating using a language processing machine learning model, wherein the creating comprises reformulating the natural language explanation into the natural language rule, and wherein the reformulating comprises altering content and linguistic characteristics of the natural language explanation using the language processing machine learning model;

store the natural language rule in a rule library;

receive an input to the machine learning model;

retrieve, in response to the input, one or more relevant rules from the rule library based on determining semantic similarity between the input and a subset of available rules stored in the rule library;

generate, using the machine learning model, a response based on the input and the one or more relevant rules, wherein the one or more relevant rules, as a result of being retrieved based on the determining of the semantic similarity, enable the machine learning model to generate the response with at least a same level of accuracy without fine-tuning the machine learning model; and perform an action based on the response.

10. The non-transitory computer readable medium of claim 9, wherein the instructions, when executed by the one or more processors, further cause the system, prior to the storing the natural language rule in the rule library, to perform one or more validation checks on the natural language rule.

11. The non-transitory computer readable medium of claim 10, wherein the one or more validation checks comprise one or more of:

determining whether the natural language rule reduces the discrepancies between the output and the associated training output;

comparing the natural language rule to existing rules in the rule library based on a threshold similarity level; or evaluating the natural language rule based on efficiency parameters.

* * * * *